Figure 1:
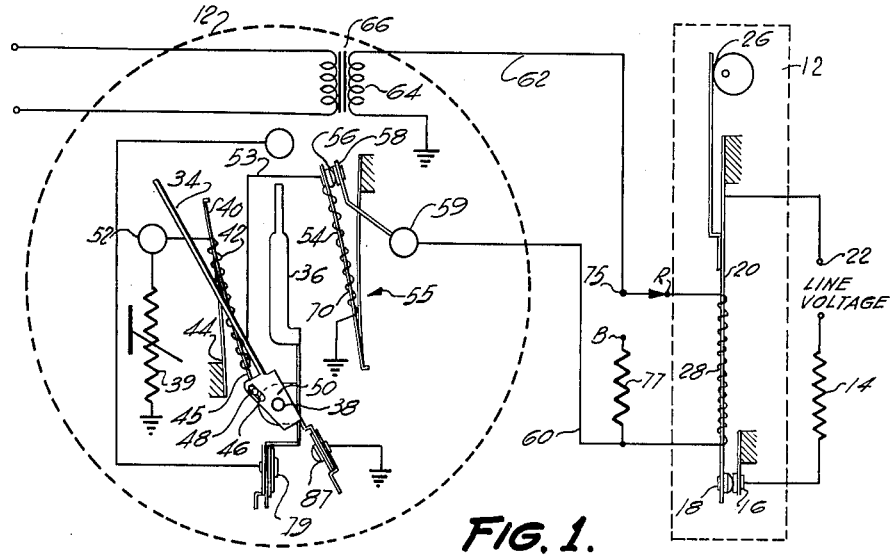

INVENTOR
Marshall Miles
By William J. Newman
ATTORNEY

United States Patent Office 3,251,980
Patented May 17, 1966

3,251,980
CONTROL SYSTEM FOR OVENS
Marshall Miles, Wilmette, Ill., assignor to Stewart-Warner Corporation, Chicago, Ill., a corporation of Virginia
Original application Nov. 21, 1962, Ser. No. 239,112. Divided and this application Jan. 18, 1965, Ser. No. 429,940
4 Claims. (Cl. 219—516)

This invention relates to control systems for ovens, and more particularly to control systems for roasting meats or other food products in which it is desirable to maintain control of the internal temperature of the food product being cooked.

This application is a division of the copending application of Marshall Miles, Serial No. 239,112, filed November 21, 1962, and subsequently abandoned.

Presently accepted methods of roasting meat involve cooking in an oven which is held at an approximately constant temperature, usually 300° F. to 350° F. and allowing meat to cook until its internal temperature reaches a point indicating the desired degree of doneness. This point is, for example, 160° F. for medium beef. The length of time required to complete the roast is thus a function of the weight and quality of the meat as well as oven temperature. These variables are complexly interrelated and the cook has no means available to control conditions so that the roast will be completed to the desired internal temperature at the time of serving. The only choice with present systems is to use a high enough oven temperature so that completion is certain before serving time and to try to keep the roast warm if it should be completed prior to serving time. This frequently means the cook must start the roasting process at an inconvenient time and/or serve a roast that has been dried by an extended delay before serving.

It is well established that low temperature long time roasting of meats results in improved flavor and tenderness, as well as less shrinkage and fuel consumption. It is, therefore, desirable to provide a system in which the oven temperature is programmed as a function of the meat temperature. In such a system the temperature of the oven is controlled in accordance with the temperature of the meat so that when the meat approaches the desired temperature representative of the degree of doneness, the oven temperature is at a level just sufficient to maintain the meat at that temperature without further cooking.

It is, therefore, a primary object of this invention to provide a control system for cooking meat or the like in which the cooking temperature is programmed in accordance with the internal temperature of the meat so as to control the maximum internal temperature thereof.

In one embodiment of this invention the teachings thereof are used in a "keep warm" system in which the meat is brought up to temperature over an uncontrolled time period and maintained at the desired temperature until time for serving. Presently available systems of this type simply turn the oven temperature down at a preset time and/or temperature. The problem with this method is that considerable cooking occurs during the oven coast down. In order to prevent this from becoming a major factor, some manufacturers have proposed the use of a fan to get rid of unwanted oven heat. Others have anticipated the coast down by having a clock cause the oven to decrease in temperature prior to the meat actually reaching the desired temperature.

Briefly, the "keep warm" system embodying the present invention comprises a settable thermostat which is operable responsive to oven temperature for controlling the heat therein. The thermostat is arranged and constructed so as to be controllable by a second heating source which is operable responsive to the internal temperature of the meat being cooked. The auxiliary heating source comprises a heater winding adjacent the bimetal element of the thermostat which is connected in an electric circuit including a temperature responsive resistance probe insertable in the meat. Thus, as the temperature of the meat increases, the auxiliary heat source causes the bimetal element in the thermostat to react so as to reduce the oven temperature. When the temperature of the meat reaches its desired level, the oven is controlled so that its average temperature is just enough to maintain the meat at the desired level. It is, therefore, an object of this invention to provide an oven control system in which the temperature of the oven is controlled in accordance with the internal temperature of the meat so as to bring the internal temperature to a desired temperature level and maintained thereat.

Probably, the most desirable method of roasting would use the maximum time available for cooking by adjusting the oven temperature throughout the cooking process so that the meat temperature rises uniformly and just reaches the desired temperature indicative of the degree of doneness at the moment of serving time. There is herein described and claimed a second embodiment of the invention in which the oven temperature is controlled not only by the meat being cooked but also as a function of time so that it will reach its desired temperature at the end of the preselected time. Briefly, this system comprises an oven thermostat with an auxiliary heat source controlled by a temperature responsive resistance probe for the meat. In addition, however, there is provided a timing means which causes the auxiliary heat source to vary also as a function of time. Thus the oven thermostat varies the oven temperature as a function of both the internal temperature of the meat and time.

Figure 3:
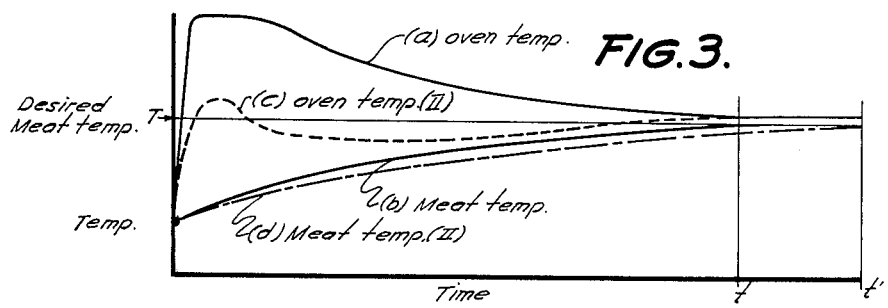
Figure 2:
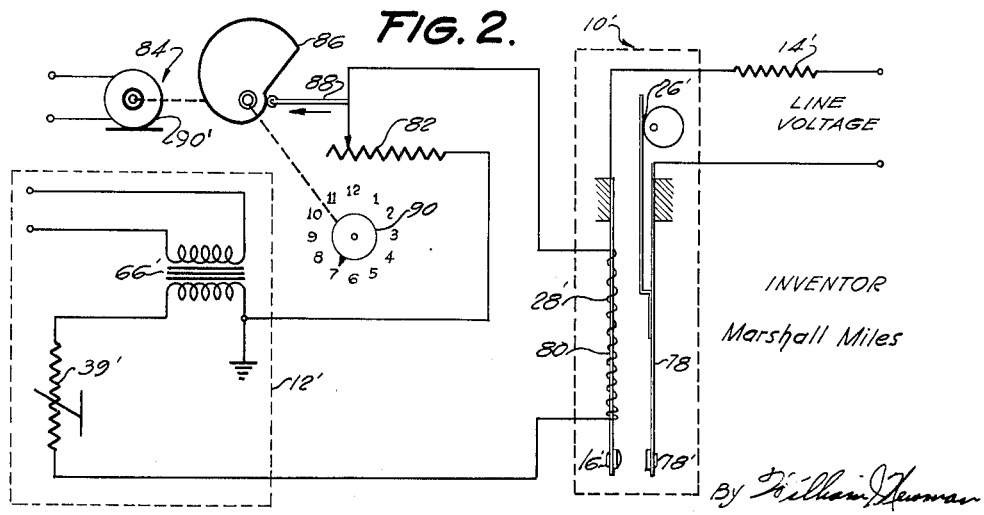

This invention, as hereinbefore briefly described, will be better understood upon further reading of this specification especially taken in view of the accompanying drawings in which:

FIG. 1 is a schematic diagram of a first embodiment of the invention in which the control system operates as a "keep warm" system to control the temperature of the oven as a function of the internal temperature of the meat being cooked so as to bring the temperature of the meat to a desired temperature level based on the desired degree of doneness and maintained at that temperature until serving;

FIG. 2 is a schematic diagram of a second embodiment of this invention wherein the oven temperature is controlled as a function of both the internal temperature of the meat and time so that the internal temperature of the meat is slowly brought up to the desired internal temperature level over a desired time interval to reach the desired temperature at the end of the desired time interval; and FIG. 3 is a graphic representation of the oven and meat temperatures as a function of time for the embodiments shown in FIGS. 1 and 2.

Referring now to the "keep warm" control system of FIG. 1 there is shown a thermostat unit 10 which is positioned in the oven to be subjected to the atmosphere therein and a meat thermometer unit 12 to be located elsewhere as hereinafter described. In this system the oven heater element 14 is connected in series through normally closed contacts 16 and 18 as well as the bimetal strip 20 to a line source voltage at 22. Closed contacts 16 and 18 allow current to flow through the heater element 14 causing the oven to heat. Contact 18 is supported on the bimetal strip 20 and the tension with which it causes contact 18 to meet with contact 16 is adjustable by means of the cam and lever arrangement 26 or any other suitable means. This provides a manual means for setting the desired temperature.

The bimetal 20 is exposed to oven temperature and is so arranged that increasing temperatures will cause contact 18 to separate from stationary contact 16. Thus, at a temperature established by tension from the adjusting means 26 the contacts will separate until the oven temperature drops sufficiently to cause them to remake. Accordingly, the average oven temperature will be maintained at a set point established by adjustment providing that there is no other agency affecting the tension between the contacts 16 and 18.

However, the bimetal 20 has a heater winding 28 surrounding or closely adjacent thereto which may be subjected to an electric current as hereinafter described. The net effect of this part of the thermostatic unit 10 is such that, although a set temperature may have been established by appropriately adjusting the tension of the bimetal 20, the set point can be altered by energizing the heater winding 28. The direction of altering is such that increasing the temperature of heater 28 will change the set point to a lower temperature. In other words, the oven temperature can be regulated by the amount of energy put into heater 28; the more current flowing through 28 the lower the established oven temperature. This is because additional heat from the heater 28 will cause the bimetal 20, and hence contact 18, to deflect further to the left as viewed in FIG. 1 requiring the oven temperature to drop to a lower value during its off time to remake the contacts 16, 18.

In the meat thermometer unit 12 is a temperature indicating arm 36 and a temperature setting arm 34, both mounted upon a single pivot 38 for separate rotation thereabout. The temperature setting arm 34 is manipulatable for setting the desired temperature of the food in order to energize an alarm. The indicating arm 36, however, is operable by the electrical circuit components for rotation responsive to the temperature of the meat which is sensed by a thermistor 39 located in a probe insertable into the meat.

The indicator arm 36 is rotated about its pivot 38 by means of a deflectable bimetal element 40 which is operated responsive to heat generated in its heater winding 42 wrapped therearound. The bimetal 40 is a U-shaped element having one of its legs in rigid support at its end 44. The other leg 45 of the element 40 has the heater winding 42 wrapped therearound and carries a pin 46 at its extreme end which operationally engages a slot 48 in the pivotally supported end 50 of the indicator arm 36. Thus, as current flows through the winding 42, through a circuit to be hereinafter described, the heat generated causes the arm 45 to deflect concavely to the right as viewed in FIG. 1 so that the pin 46 interacts with the slot 48 on the arm 36 to cause it to rotate in a clockwise direction. The bimetal element 40 is U-shaped to provide variable ambient temperature compensation in a well known manner.

One end of the heater winding 42 is connected to jack 52 which also is connected to the thermistor 39. The other end of the winding 42 is connected by lead 53 to a second bimetal element 54 which forms a part of a voltage regulator 55 in the circuit for energizing the winding 42. The bimetal 54 carries a contact 56 which is engageable with a positionally fixed contact 58. The contact 58 is electrically connected to jack 59 which also receives lead 60 from one end of the heater winding 28 in the thermostat unit 10. The other end of the heater winding 28 is connected by lead 62 to the secondary 64 of a step-down transformer 66 supplying reduced voltage thereto from a standard line source.

The regulator 55 is included in the thermometer unit 12 for producing a relatively constant mean effective voltage to energize the heating winding 28 and the indicator arm bimetal winding 42. The bimetal element 54 in regulator 55 is also U-shaped having the end of one leg rigidly supported with the other leg supporting the contact 56. This leg carries a heater winding 70 having one end connected to ground and the other end connected to the contact 56 so that the winding is energizable by the secondary of the transformer 66 through the circuit including ground, winding 70, contacts 56 and 58, line 60 and heater winding 28. Since the winding 70 is energized through the contacts 56, 58, the contacts are caused to intermittently make and break cylically in accordance with a period determined by the spring tension between the contacts. The regulator operates to produce a relatively constant mean effective voltage as follows: If the line voltage at the transformer 66 increases, the period of the cycle operation of the regulator 55 also increases, thus reducing the mean effective voltage applied to the winding 62. Conversely, when the line voltage decreases, the period of cyclic operation of the regulator also decreases which causes an increase in the mean effective voltage applied to the heater winding 42. The U-shape of the bimetal element 64 again provides ambient temperature compensation for the voltage regulator 55.

The average current flowing into meat thermometer 12 through the heater winding 28 will be dependent on the resistance of the thermistor 39 which is insertable into the meat being cooked. This current will result in power developed within heater 28 and will vary as a function of the resistance of the thermistor. If the thermistor is buried within a piece of meat which is cold the amount of power dissipated in the heater will be small because of the negative temperature coefficient of thermistors. Thus, there will be comparatively little deflection of bimetal 20 and its contact 18 in the thermostat unit 10 so that the operation of the thermostat unit will be dependent primarily upon the temperature in the oven. However, as the temperature of the meat increases, the resistance of the thermistor 39 decreases and the power dissipated in the heater element 28 increases causing a greater deflection of contact 18 away from its stationary mate 16. As this deflection increases the set point will gradually decrease resulting in a gradual lowering of the oven temperature. Further increase of meat temperature will result in further decrease of oven temperature until an equilibrium state occurs.

Referring now to the temperature vs. time graph of FIG. 3, curve (a) represents the programmed oven temperature for cooking the meat to a desired temperature. Curve (b) represents the internal temperature of the meat as it approaches the desired temperature. Thus at the beginning of the cooking time, when the meat is still cool, the oven temperature is at its maximum temperature. As the meat temperature approaches the desired temperature T, the oven temperature is gradually decreased so that at the time $t$ reaches the desired value the oven temperature is only slightly greater to maintain the meat temperature thereat and supply any heat losses in the system.

It is to be noted in the system of FIG. 1 that the thermostat unit 10 and the thermometer unit 12 may be used in a conventional manner to cook foodstuffs in the oven merely by operating a switch 75 which removes the heater winding 28 on the circuit and replaces it with resistor 77. The thermostatic unit 10 is therefore dependent completely on the oven temperature and the variations in the resistance of the thermistor serve only to operate the indicator arm 34 of the meter. The contacts 79 and 81 on the indicator arm 34 and settable arm 36, respectively, may be used to complete a circuit to an alarm device if desired to indicate the attainment of a desired temperature.

Reference is now made to FIG. 2 wherein is shown a system for controlling the oven temperature as a function of time, as well as a function of the internal temperature of the meat.

The oven thermostat unit 10' shown in FIG. 2 is somewhat different than that described for the embodiment of FIG. 1, but it operates in substantially the same manner and is in fact interchangeable therewith so that either thermostat unit 10 or 10' will work with either the systems of FIG. 1 or FIG. 2. In the device 10' of FIG. 2 the oven heater element 14' is connected in series through normally closed contacts 16', 18' with the line source voltage. Closure of contacts 16', 18' allows current flow through the heater element 14' causing the oven to heat. Contact 18' is supported on bimetal strip 78 whose tension is adjustable by cam and lever means 26' in a manner similar to the unit 10 of FIG. 1. The bimetal 78 is exposed to oven temperatures and is so arranged that increasing temperatures will cause contact 18' to separate from contact 16' mounted on a separate bimetal 80. The auxiliary heater winding 28' surrounds the bimetal 80 providing the control of the thermostat unit 10' from the auxiliary means as hereinafter described.

The meat thermometer unit 12' of FIG. 2 is shown in its simplest form including thermistor 39' and the stepdown transformer 66' in series connection with the auxiliary heater winding 28'. The voltage regulator and temperature indicator units may be included in the unit 12' but are eliminated in this description for purposes of simplicity.

Also included in the series circuit is a variable resistor 82 which may be adjusted to operate through a desired portion of its range by timer means 84 hereinafter described. Thus, for a given setting of the variable resistor 82 the thermistor 39 will cause the set point of the oven thermostat unit 10' to lower with increasing temperatures of the meat so that the oven temperature will be reduced therewith and the oven and meat temperature curves would be similar to curves (a) and (b) shown in FIG. 3. However, it is the purpose of this system to control the temperatures so that the meat just reaches the desired temperature in a preselected time t'. The flavor and tenderness of the meat is improved with less shrinkage and fuel consumption with the low temperature, long time roasting of the meats.

The timer means 84 comprises a cam 86 with a follower 88 operable to actuate the variable resistor 82. The cam 86 is driven by a motor 90' which is operable through gear means (not shown) to rotate the cam through a full cycle in an extended length of time such as 12 hours. The cam 86 is presettable from its "at rest" position as shown in FIG. 2 in a counterclockwise direction at any point representative of a desired time interval up to 12 hours. An indicator arm 90 is connected to the rotatable cam 86 to indicate on a dial face the desired time setting. The cam 86 is settable from a maximum resistance setting of resistor 82 at zero time to a minimum resistance setting for a desired 12-hour cooking period. Thus, the resistance in series with the thermistor 39' and heater element 28' will increase as a function of time so that less power is delivered to the heater 28' causing the temperature of the oven to increase with the passage of time.

The purpose of the thermistor 39' which is inserted into the meat is, of course, to prevent the temperature of the meat from rising too rapidly and overshooting its desired temperature established by the timer means 84. In other words, the thermistor 39' serves to maintain the desired rate of increase of the meat temperature in accordance with the timer means and if there is a variance from the rate of its temperature increase, the immediate oven temperature is changed to restore the meat to its proper program value.

In FIG. 3 curve (c) represents the oven temperature as it varies with time and curve (d) represents the meat temperature vs. time for the above described programming system. It will be noted that after the initial rapid rise of the oven temperature due to the cold meat, the system stabilizes itself so that the oven temperature is programmed to gradually rise and raise the temperature of the meat at a rate to reach its desired temperature at the end of the time cycle with a minimum amount of energy consumption. The oven is kept just warm enough to maintain the steady rise of the meat temperature along its desired program.

While there have been described two systems embodying the teachings of this invention, it is recognized many modifications and variations may be made thereto. It is intended, therefore, to be bound only by the scope of the appended claims.

What is claimed is:

1. An oven heater control system for regulating the cooking temperature of foods cooked therein comprising thermostat means in said oven, manually operable means for setting said thermostat means to select a desired maximum oven temperature, means operable responsive to the temperature of said food for automatically controlling the setting of said thermostat means to tend to reduce the oven temperature as the food temperature increases, and timing means for controlling said thermostat means to gradually increase the oven temperature to bring the food to a desired temperature in a desired time period.

2. An oven heater control system for regulating the cooking temperature of foods cooked therein comprising thermostat means in said oven, manually operable means for setting said thermostat means to select a desired maximum oven temperature, means insertable into said food for producing a signal varying in a manner relative to the temperature of said food, timer means for varying said signal in an opposite manner as a function of time, and means operable responsive to said signal for automatically controlling said thermostat means to gradually increase the oven temperature to bring the food to a desired temperature in a desired time period.

3. In combination with an electric oven having a heater element and an exhaust vent, a control system for regulating the temperature of said oven in accordance with the temperature of foods cooked therein comprising a first bimetal element in said exhaust vent, a first contact on said first bimetal element, a second bimetal element adjacent said first bimetal element, a second contact on said second bimetal in normal engagement with said first contact, means serially connecting said contacts with said heater element, said first bimetal element being deflectable in a direction to disengage said contacts with a rise in oven temperature, means for manually controlling the pressure between said contacts to select a desired maximum oven temperature, a second heater element adjacent said second bimetal element, a negative temperature coefficient thermistor insertable into said food, a pulse-type voltage regulator, a voltage source serially connected with said second heater element, voltage regulator and thermistor, said second bimetal element being deflectable in a direction to lessen the pressure between said contacts with a rise in the heat output of said second heater element, a variable resistance element in series with said second heater element, motor and cam means operable through a predetermined time cycle for operating said variable resistance element through an increasing resistance range, and means for setting said motor and cam means to operate through a desired portion of said cycle.

4. In combination with an electric oven having a heater element, a control system for regulating the temperature of said oven in accordance with the temperature of foods cooked therein comprising a pair of contacts in series connection with said oven heating element, means including at least one bimetal element in said oven for maintaining said contacts, said bimetal element being deflectable in a direction to disengage said contacts with a rise in temperature, means for manually controlling the pressure between said contacts to select a desired maximum oven temperature, a second heater element adjacent said bimetal element, a negative temperature coefficient thermistor insertable into said food, and a voltage source serially connected with said second heater element and thermistor, a variable resistance element in series with said second heater element; motor and cam means operable through a predetermined time cycle for operating said variable resistance element through an increasing resistance range, and means for setting said motor and cam means to operate through a desired portion of said cycle.

References Cited by the Examiner
UNITED STATES PATENTS

| | | | |
|---|---|---|---|
| 2,344,820 | 3/1944 | Kearsley | 219—492 X |
| 2,914,644 | 11/1959 | Holtkamp | 219—516 X |
| 2,933,585 | 4/1960 | Holtkamp | 219—516 X |

RICHARD M. WOOD, *Primary Examiner.*

R. F. STAUBLY, *Assistant Examiner.*